United States Patent [19]

Bouvot et al.

[11] Patent Number: 4,638,723
[45] Date of Patent: Jan. 27, 1987

[54] REDUCED PRESSURE CONTROL DEVICE FOR MOVING A MOVABLE MEMBER BETWEEN THREE POSITIONS

[75] Inventors: Jean-Francois Bouvot, Dampierre; José Leborgne, Trappes, both of France

[73] Assignee: Valeo, Paris, France

[21] Appl. No.: 636,739

[22] Filed: Aug. 1, 1984

[30] Foreign Application Priority Data

Aug. 10, 1983 [FR] France .................. 83 13182

[51] Int. Cl.⁴ ............................................. F01B 19/00
[52] U.S. Cl. .......................................... 92/48; 24/621;
24/622; 74/581; 92/64; 92/76; 403/152;
403/331; 411/508
[58] Field of Search ................ 92/48, 64, 76, 97, 49,
92/98 D; 74/581; 24/297, 621, 622; 411/508;
403/71, 152, 331

[56] References Cited
U.S. PATENT DOCUMENTS

| 732,245 | 6/1903 | Weiss | 411/508 |
|---|---|---|---|
| 2,680,375 | 6/1954 | Schaus | 92/48 |
| 3,116,918 | 1/1964 | Francis | 92/49 |
| 3,262,335 | 7/1966 | Heinlein et al. | 74/581 |
| 3,613,513 | 10/1971 | Johnson | 92/48 |
| 3,981,229 | 9/1976 | Breisch et al. | 92/187 |
| 4,231,287 | 11/1980 | Smiley | 92/98 R |
| 4,238,991 | 12/1980 | Pickles | |

Primary Examiner—Abraham Hershkovitz
Attorney, Agent, or Firm—Dennison, Meserole, Pollack & Scheiner

[57] ABSTRACT

A housing (10, 12, 14) has first and second flexible membranes (32, 42) dividing it into two sealed chambers plus a third chamber from which the movable member (38) projects. Each membrane co-operates with a respective cup (40, 50) and return springs (54, 56) tend to urge both cups away from an end wall (26). The two cups are interconnected by a single piece member (58) which is inextensible but which can readily be bent in two to enable the cups to come into contact with one another. Each sealed chamber can individually be selectively connected to a source of reduced pressure via a respective orifice or pipe fitting (30, 28). The position of the movable member (38) can thus be changed.

5 Claims, 7 Drawing Figures

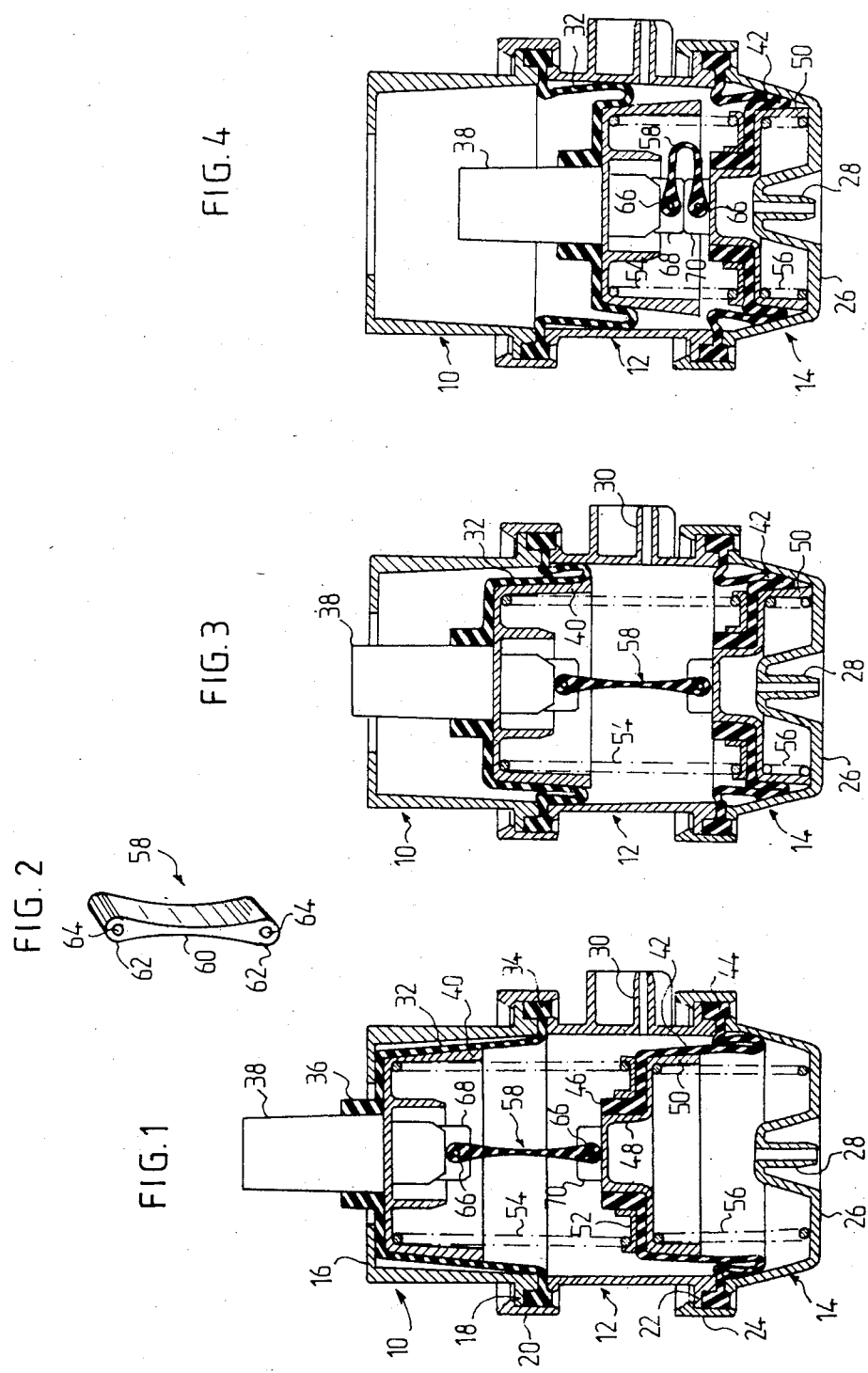

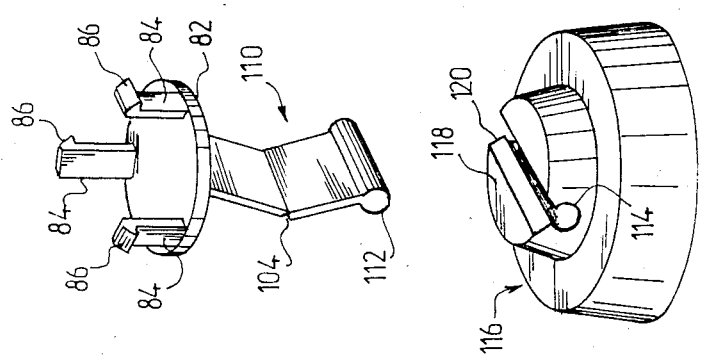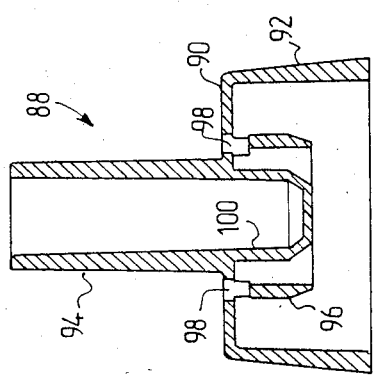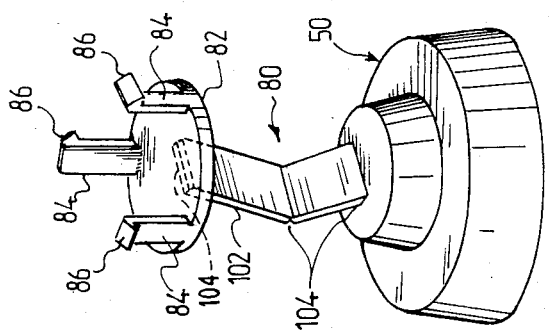

REDUCED PRESSURE CONTROL DEVICE FOR MOVING A MOVABLE MEMBER BETWEEN THREE POSITIONS

The invention relates to a control device controlled by means of reduced pressure and capable of moving a movable member into a selected one of three different positions.

BACKGROUND OF THE INVENTION

Such control devices are used, in particular, for controlling the position of a flap or the like in a heater system or air conditioning system for the cabin of a motor vehicle. Devices controlled by means of reduced pressure are presently preferred to devices controlled by means of cable because the operate more smoothly. In addition, in the event of a breakdown in which the source of reduced pressure in no longer operative, the flap or the like is automatically returned to a failsafe or safety position. For example, this could correspond to a position in which the windscreen is demisted or defrosted. In contrast, if a control cable is broken, it is not possible to ensure that the flap or the like returns to a failsafe position.

Known reduced pressure control devices for moving a movable member between three positions comprise a housing whose interior is divided into sealed chambers by means of two flexible and deformable membranes which are fixed to the housing at their peripheries. Each of the membranes has a rigid cup mounted thereon, one of which is mounted to move the movable member outside the housing in some suitable manner, and the other of which is connected to the first by a telescopic or retractable type of link member serving to establish predetermined maximum and minimum distances between the cups. Each sealed chamber has a respective orifice or pipe fitting capable of being selectively connected to atmospheric pressure or to a source of reduced pressure. A first return spring is interposed between the membranes, and a second return spring is interposed between the second membrane and an end wall of the housing. The movable member can thus be moved to a first position by leaving both orifices connected to atmospheric pressure, to a second position by connecting one of the orifices to the reduced pressure, and to a third position by connecting both orifices to the reduced pressure.

It has been found that the telescopic or retractable link member complicates assembly of the device, thus increasing its cost, and also adds to the length of the device.

Preferred embodiments of the invention avoid these drawbacks and do so in a simple, effective and cheap manner.

SUMMARY OF THE INVENTION

The present invention provides a reduced pressure control device for moving a movable member between three positions, the device comprising:

a housing;

first and second membranes which are flexible and deformable and which are fixed inside the housing by their peripheries to form first and second independent sealed chambers inside the housing, the first chamber extending between the first and second membranes, and the second chamber extending between the second membrane and an end wall of the housing;

a first cup mounted on the first membrane and connected to move the said movable member through a wall of the housing;

a second cup mounted on the second membrane and connected to the first cup by a link having predetermined maximum and minimum lengths;

a first spring interposed between the two cups;

a second spring interposed between the second cup and the said end wall of the housing; and first and second orifices or pipe fittings suitable for selectively connecting said first and second chambers respectively to atmospheric pressure or to a source of reduced pressure;

the improvement wherein the said link between the first and second cups is a single-piece member which is non-extensible and elongate in form, the link member having a portion of reduced thickness between its ends whereby the link member is capable of taking up an extended position between the first and second cups which are then separated by a predetermined maximum distance, and is also capable of taking a folded position between the cups which are then separated by a minimum distance.

Assembly of the control device is thus simplified since the link member between the two cups is a single part. The axial length of the device as a whole is also reduced since the link member can be folded flat between the two cups, thus occupying less room than is required for a telescopic link.

The link member is advantageously made of a strip or tape of material which bends easily and which has its ends pivotally mounted to the two cups about respective parallel transverse axes. Alternatively, the link member may be in the form of a flat rigid strip having a folding hinge in the middle and at least one of its ends.

The flat rigid link member is advantageously obtained integrally with one of the cups and has snap fastening means at its free end for engaging the other cup.

BRIEF DESCRIPTION OF THE DRAWINGS

Embodiments of the invention are described by way of example with reference to the accompanying drawings, in which:

FIG. 1 is a longitudinal section through a control device in accordance with the invention, and is shown in a first position;

FIG. 2 is a perspective view of the link member used in the control device shown in FIG. 1;

FIGS. 3 and 4 are similar views to FIG. 1 showing the device respectively in a second position and in a third position;

FIG. 5 is a diagrammatic perspective view of another embodiment of a link member in accordance with the invention;

FIG. 6 is a diagrammatic longitudinal section through a first cup corresponding to the FIG. 5 link member; and FIG. 7 is a perspective view of a third embodiment of a link member in accordance with the invention, together with a corresponding second cup.

MORE DETAILED DESCRIPTION

Reference is made initially to FIGS. 1 to 4 which show a first embodiment of the invention.

A first control device in accordance with the invention comprises a generally cylindrical housing constituted by an assembly of three axially aligned housings 10, 12 and 14, which are shown in the figures with the first housing 10 at the top of the assembly. Terms such as "up" or "down" or "top" or "bottom" are used in relation to the orientation shown in the figures, but it will be understood that the control device can take up any orientation in use.

The first housing 10 has a top wall 16 with an axial orifice, a cylindrical side wall, and an outwardly directed flange 18 at the bottom of the side wall. The middle housing 12 is in the form of a tube which is open at both ends, with a ring of resiliently deformable hooks 20 at its top end for snap fitting to the bottom flange 18 of the top housing, and with an outwardly directed flange 22 at its bottom end. The tubular side wall of the middle housing 12 includes a tubular pipe fitting 30 giving access to the inside of the middle housing 12. The bottom housing 14 has a bottom wall 26 having a tubular pipe fitting 28 giving access to the inside of the bottom housing 14, a cylindrical side wall, and a ring of resiliently deformable hooks 24 at the top of its side wall for snap fitting to the bottom flange 24 of the middle housing 12.

A first annular membrane 32 of flexible and deformable material has a rim 34 at its outer periphery which is fixed between the top housing 10 and the middle housing 12. The first annular membrane 32 further has an axial sleeve 36 around its inner periphery which is a tight fit around an axial rod 38 projecting upwardly from a first cup 40 which is pressed against the lower surface of the first membrane.

A second annular membrane 42 of flexible and deformable material is of the same type as the first annular membrane, having a rim 44 at its outer periphery which is fixed between the middle housing 12 and the bottom housing 14, and an axial sleeve 46 around its inner periphery which is a tight fit around an upwardly directed closed cylindrical projection from a second cup 50 which is pressed against the lower surface of the second membrane.

An annular washer 52 having raised edges surrounds the sleeve 46 and is pressed down against the top surface of the second membrane 42 by the bottom end of a first return spring 54 whose top end presses upwardly against the lower horizontal surface of the first cup 40.

A second return spring 56 is interposed between bottom wall 26 of the bottom housing 14 and the lower horizontal surface of the second cup 50.

A link member 58 interconnects the first and second cups 40 and 50.

In accordance with the invention, the link member is a single part constituted by a thin strip or tape which elongate in shape and which is made of an elastomer material which is substantially inextensible, but which is flexibel for bending. As can be seen in the figures, the member 58 is thinner at its middle 60 than at its end 62, thereby facilitating bending about its middle 60 as shown in FIG. 4, and also facilitating the provision of a transverse bore or passage 64 at each end 62 for receiving a respective fastening pin 66. The top end of the member 58 is thus pivoted in a fork 68 projecting down from the first cup 40 while the bottom end of the member 58 is pivoted in a fork 70 projecting up from the closed cylindrical projection 48 of the second cup 50.

The control device operates as follows:

The first position shown in FIG. 1 corresponds to both pipe fittings 28 and 30 being open to atmospheric pressure. In this position, the first cup 40 presses, via the first membrane 32, against the top wall 16 of the first housing 10, and the second cup 50 occupies a position near the middle of the housing as a whole. In this position, the link member 58 is under tension from the first spring 54 and is therefore straight, thus defining the distance between the cups 40 and 50.

The control device is caused to take up an intermediate position as shown in FIG. 3 by connecting the pipe fitting 28 to reduced pressure while leaving the pipe fitting 30 connected to atmospheric pressure. The effect of reducing the pressure between the bottom wall 26 of the bottom housing 14 and the second membrane 42 is to move the second cup 50 down towards the bottom wall 26 against the reaction of the second return spring 56. As shown, the forces and dimensions are chosen such that the cup 50 comes into abutment with the botom wall 26. The displacement of the second cup 50 is transmitted to the first cup 40 by the link member 58 which is substantially inextensible. The second position of the rod 38 is thus repeatable since the second cup abuts against the bottom wall and the link member is substantially inextensible.

The control device is caused to pass from the second position shown in FIG. 3 to a third position shown in FIG. 4 by connecting the pipe fitting 30 to reduced pressure at the same time as the pipe fitting 28 is connected to reduced pressure. The reduced pressure in the chamber between the first and second membranes 32 and 42 causes the first cup 40 to move down towards the second cup 50 against the reaction of the first return spring 54. As shown, the forces and dimensions are chosen so that the cup 40 comes into abutment with the cup 50 (via the forks 68 and 70). In this position the link member 58 is folded by bending about its middle 60 and by pivoting about its fastening pins 66. The third position of the rod 38 is thus likewise repeatably defined.

The control device returns from the third position (FIG. 4) to the second position (FIG. 3) by reconnecting the pipe fitting 30 to atmospheric pressure while leaving the pipe fitting 28 connected to the reduced pressure, and it returns from the second position to the first position (FIG. 1) by reconnecting the pipe fitting 28 to atmospheric pressure.

Reference is now made to FIGS. 5 and 6 which show a variant embodiment of a control divice in accordance with the invention.

In this embodiment, the link member 80 between the two cups in integral at its bottom end to the second cup 50 and has a horizontal disk 82 it its top end with a plurality of upwardly directed resilient tabs 84 spaced around its periphery. The top ends of the tabs have outwardly directed hooks 86 for snap fitting to teh first cup 88 as shown in longitudinal section in FIG. 6.

The first cup 88 has a circular base 90 surrounded by a downwardly directed skirt 92 which is slightly flared downwardly. The first cup 88 also has an upwardly directed tubular rod 94. The base 90 has a downwardly directed tubular sleeve 96 coaxial with, and inside, the skirt 92. The sleeve 96 has holes 98 at selected points around its join to the base 90 for recieving the hooks 86 of the link member 80. There is a downwardly directed extension 100 of the tubular rod 94 which is coaxial with and inside the sleeve 96, and which engages the disk 82.

The link member 80 may be integrally molded with the second cup 50, in which case it is made of a plastic material such as a polymide which may optionally be impregnated with inert material. The link member includes a thin strip 102 of rigid material which extends between the second cup 50 and the disk 82. The rigid strip hs three horizontal flexible hinges 104 in the form of regions of reduced thickness. One of the hinges 104 connects the strip 102 to the second cup 50, the next hinge 104 lies in the middle of the strip 102 and the third hinge 104 connects the strip 102 to the disk 82. The three hinges 104 enable the link member to fold when the control device is in the third position as shown in FIG. 4.

The cariant shown in FIG. 7 differs from that shown in FIGS. 5 and 6 in that the link member 110 is a separate item from the second cup 50. Thus the top of the link member 110 is identical to teh top of the link member 80 and is not described further. However, the bottom hinge 104 is replaced by a transverse cylindrical portion 112 constituting a hinge pin, and the top of the second cup 116 has an upwardly projecting cylindrical portion 118 with a transverse groove in the form of a cylindrical bore 114 for receiving the portion 112 and a flared slot 120 opening up the top side of the bore 114. The separate link member 110 is thus assembled to the second cup 116 rather than being integral therewith.

In the embodiments shown in FIGS. 5 to 7, the flexible hinges 104 may either be obtained directly by mold regions of reduced thickness as mentioned above, or else they may be formed in the plastic of the strip 102 after molding, e.g. by compression or crushing.

We claim:

1. A reduced pressure control device for moving a movable member between three position, the device comprising:
    a housing defined by surrounding walls including an end wall;
    first and second flexible and deformable membranes fixed inside the housing to form first and second independent sealed chambers inside the housing, the first chamber extending between the first and second membranes, and the second chamber extending between the second membrane and the end wall of the housing;
    a movable member extending through a wall of the housing remote from the end wall;
    a first cup mounted on the first membrane and connected to the movable member to move said movable member;
    a second cup mounted on the second membrane and connected to the first cup by a link having predetermined maximum and mimimum lengths;
    a first spring interposed between the two cups;
    a second spring interposed between the second cup and the end wall of the housing; and
    first and second orifice means for connecting said first and said chambers respectively to atmospheric pressure or to a source of reduced pressure;
    the improvement wherein the said link between the first and second cups is a flat single-piece strip of rigid material having opposed ends and being non-extensible and elongate in form, the strip having a portion of reduced thickness centrally between its ends defining a folding hinge, the link being capable of assuming an extended position between the first and second cups which are then separated by a predetermined maximum distance, and also being capable of assuming a folded position of greater that 90° between the cups which are then separated by a minimum distance, and a transverse disk integral with the strip at one of its ends, said strip having a second portion of reduced thickness between the strip and the disk defining a second folding hinge whereby said link is capable of assuming a folded position relative to said disk, said transverse disk having resiliently deformable tabs for snap fitting to one of the cups, said one cup including aperture means defined therethrough for receiving said resiliently deformable tabs and locking said transverse disk to said one cup, said resiliently deformable tabs being integrally formed with said transverse disk and projecting outwardly relative to said strip from peripherally spaced points about said disk, said one cup to which said tabs are snap-fitted comprising said first cup and including an annular sleeve extending outward and terminating in an open end receiving said deformable tabs therethrough, said aperture means being defined laterally through said sleeve inward of the open end thereof.

2. A device according to claim 1 wherein the said strip is integral at the other of its ends with the other of said cups, and a folding hinge defined between the strip and the other of said cups.

3. A device according to claim 1 wherein the strip is terminated at the other one of its ends by an integral cylindrical transverse portion suitable for being received in a substantially cylindrical groove in the other of said cups.

4. A device according to claim 3 wherein the other of said cups includes a projecting portion having said transverse cylindrical groove defined therein and pivotally receiving the cylindrical transverse portion of the strip.

5. A reduced pressure control device for moving a movable member between three positions, the device comprising:
    a housing defined by surrounding walls including an end wall;
    first and second flexible and deformable membranes fixed inside the housing to form first and second independent sealed chambers inside the housing, the first chamber extending between the first and second membranes, and the second chamber extending between the second membrane and the end wall of the housing;
    a movable member extending through a wall of the housing remote from the end wall;
    a first cup mounted on the first membrane and connected to the movable member to move said movable member;
    a second cup mounted on the second membrane and connected to the first cup by a link having predetermined maximum and minimim lengths;
    a first spring interposed between the two cups;
    a second spring interposed between the second cup and the end wall of the housing; and
    first and second orifice means for connecting said first and second chambers respectively to atmospheric pressure or to a source of reduced pressure;
    the improvement wherein the said link between the first and second cups is a flat single-piece strip of rigid material having opposed ends and being non-extensible and elongate in form, the strip having a portion of reduced thickness between its ends defining a folding hinge whereby the link is capable of assuming an extended position between the first and second cups which are then separated by a predetermined maximum distance, and is also capable of assuming of folded position between the cups which are then separated by a minimum distance, and a transverse disk integral with the strip at one of its ends, said transverse disk having resiliently deformable tabs for snap fitting to one of the cups, said one cup including aperture means defined therethrough for receiving said resiliently deformable tabs and locking said transverse disk to said one cup, said one cup to which said tabs are snapfitted comprising said first cup and including an annular sleeve extending outward and terminating in an open end receiving said deformable tabs therethrough, said aperture means being defined laterally through said sleeve inward of the open end thereof.

* * * * *